US012668521B2

(12) United States Patent
Berrebi et al.

(10) Patent No.: US 12,668,521 B2
(45) Date of Patent: Jun. 30, 2026

(54) MAGNETIC BENDING FRAME FOR COLD-FORMING THIN GLASS SHEET

(71) Applicant: CORNING INCORPORATED, Corning, NY (US)

(72) Inventors: Mickaël Berrebi, Paris (FR); Laurent Joubaud, Paris (FR); Khaled Layouni, Fontainebleau (FR); Jean-Pierre Henri René Lereboullet, Bois le Roi (FR); Elias Merhy, Saulx-les-Chartreux (FR); Ronan Tanguy, Grez sur Loing (FR)

(73) Assignee: CORNING INCORPORATED, Corning, NY (US)

( * ) Notice: Subject to any disclaimer, the term of this patent is extended or adjusted under 35 U.S.C. 154(b) by 282 days.

(21) Appl. No.: 18/036,469

(22) PCT Filed: Nov. 12, 2021

(86) PCT No.: PCT/US2021/059043
§ 371 (c)(1),
(2) Date: May 11, 2023

(87) PCT Pub. No.: WO2022/108831
PCT Pub. Date: May 27, 2022

(65) Prior Publication Data
US 2024/0010542 A1       Jan. 11, 2024

Related U.S. Application Data

(60) Provisional application No. 63/116,262, filed on Nov. 20, 2020.

(51) Int. Cl.
*C03B 23/03*       (2006.01)

(52) U.S. Cl.
CPC ................................ *C03B 23/0305* (2013.01)

(58) Field of Classification Search
CPC ......................... C03B 23/023; C03B 23/0305
See application file for complete search history.

(56) References Cited

U.S. PATENT DOCUMENTS 5,740,012 A       4/1998   Choi
7,486,165 B2     2/2009   Ligtenberg et al.
(Continued)

FOREIGN PATENT DOCUMENTS

JP           64-076923 A       3/1989
JP           2019-105859 A     6/2019
(Continued)

OTHER PUBLICATIONS

JP-2021152285 translation (Year: 2021).*
(Continued)

*Primary Examiner* — Lawrence D Ferguson
(74) *Attorney, Agent, or Firm* — Daniel J. Greenhalgh

(57) ABSTRACT

Disclosed are embodiments of a glass article of a vehicle interior system. The glass article includes a frame having a curved support surface. The frame is configured to hold at least one magnet. The glass article also includes a glass sheet having a first major surface and a second major surface opposite to the first major surface. The glass sheet is arranged with the second major surface facing toward the curved support surface. The glass article further includes a metal strip disposed on the glass sheet. The metal strip and the at least one magnet create a magnetic connection suffi- cient to hold the glass sheet in conformity with the curved support surface.

16 Claims, 14 Drawing Sheets

(56)     References Cited

U.S. PATENT DOCUMENTS

| 7,775,567 | B2 | 8/2010 | Ligtenberg et al. |
| 8,801,054 | B2 | 8/2014 | Ligtenberg et al. |
| 2012/0194308 | A1 | 8/2012 | Lauder et al. |
| 2015/0035777 | A1 | 2/2015 | Hirakata et al. |
| 2018/0188869 | A1 | 7/2018 | Boggs et al. |
| 2019/0389120 | A1 | 12/2019 | Eo et al. |

FOREIGN PATENT DOCUMENTS

| JP | 2021152285 | A | * | 9/2021 |
| KR | 10-2015-0112284 | A | | 10/2015 |
| WO | 2019/010401 | A1 | | 1/2019 |

OTHER PUBLICATIONS

Brachmann; "Design Patent Awarded to Apple for a Flat-Screen Monitor Display"; IPWatchdog; 2013, 8 Pages.

DSellers; "Apple Wins iPhone, Laptop, iMAC Patents"; 2010, 6 Pages.

International Search Report and Written Opinion of the International Searching Authority; PCT/US2021/059043; mailed on Mar. 21, 2022, 13 pages; European Patent Office.

Chinese Patent Application No. 202180085557.8 , Office Action dated Jun. 28, 2025, 4 pages (English Translation only), Chinese Patent Office.

* cited by examiner

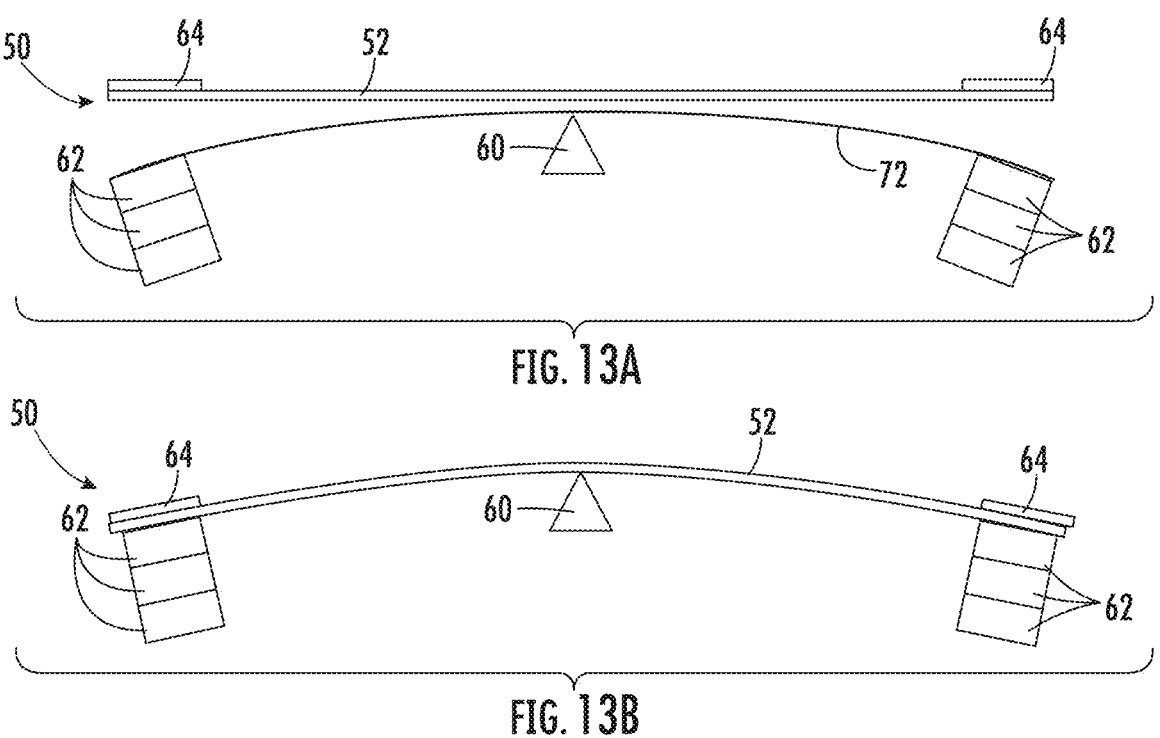
FIG. 13A
FIG. 13B
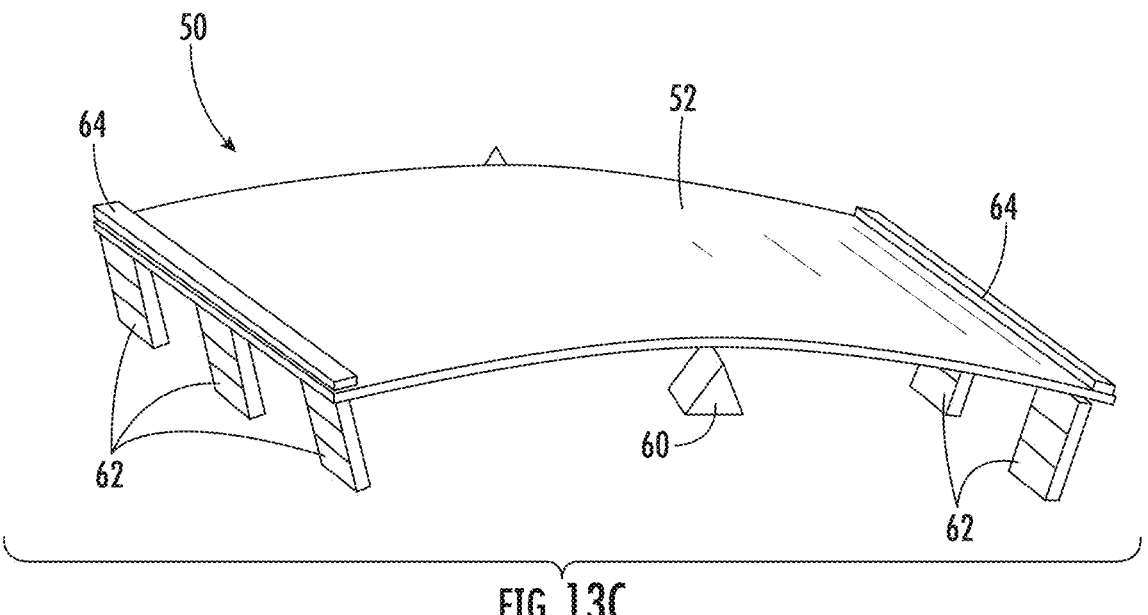
FIG. 13C

MAGNETIC BENDING FRAME FOR COLD-FORMING THIN GLASS SHEET

CROSS-REFERENCE TO RELATED APPLICATIONS

This application claims the benefit of priority under 35 U.S.C. § 371 of International Application No. PCT/US2021/059043, filed on Nov. 12, 2021, which claims the benefit of priority under 35 U.S.C. § 119 of U.S. Provisional Application Ser. No. 63/116,262 filed on Nov. 20, 2020, the content of which are relied upon and incorporated herein by reference in their entirety.

BACKGROUND

The disclosure relates to glass articles for vehicle interior systems and, more particularly, to glass articles held in the curved configuration using magnetic force.

Vehicle interiors include curved surfaces and can incorporate displays in such curved surfaces. The materials used to form such curved surfaces are typically limited to polymers, which do not exhibit the durability and optical performance as glass. As such, curved glass substrates are desirable, especially when used as covers for displays. Existing methods of forming such curved glass substrates, such as thermal forming, have drawbacks including high cost, optical distortion, and surface marking. Accordingly, Applicant has identified a need for vehicle interior systems that can incorporate a curved glass substrate in a cost-effective manner and without problems typically associated with glass thermal forming processes.

SUMMARY

According to an aspect, embodiments of the disclosure relate to a glass article of a vehicle interior system. The glass article includes a frame having a curved support surface. The frame is configured to hold at least one magnet. The glass article also includes a glass sheet having a first major surface and a second major surface opposite to the first major surface. The glass sheet is arranged with the second major surface facing toward the curved support surface. The glass article further includes a metal strip disposed on the glass sheet. The metal strip and the at least one magnet create a magnetic connection sufficient to hold the glass sheet in conformity with the curved support surface.

According to another aspect, embodiments of the disclosure relate to a method of forming a curved glass article for a vehicle interior system. In the method, a first major surface of a glass sheet is positioned over a curved support surface of a frame. The frame includes at least one magnet. A magnetic connection is formed between a metal strip disposed on the glass sheet and the at least one magnet so that the glass sheet bends into conformity with the curved support surface.

According to still another aspect, embodiments of the disclosure relate to a method of forming a curved glass article. In the method, a first major surface of a glass sheet is positioned over a curved process chuck. The curved process chuck has a magnetic surface. A magnetic connection is formed between a metal press disposed on the glass sheet and the magnetic surface so that the glass sheet bends into conformity with the curved process chuck. A frame is adhered to a second major surface of the glass sheet using an adhesive to form the curved glass article. The second major surface is opposite to the first major surface. The metal press is removed from the glass sheet after the adhesive cures to a degree sufficient to bond the glass sheet to the frame, and the curved glass article is removed from the curved process chuck.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 13A-13C depict another embodiment of a curved magnetic glass article in which the magnets are

DETAILED DESCRIPTION

Figure 1:
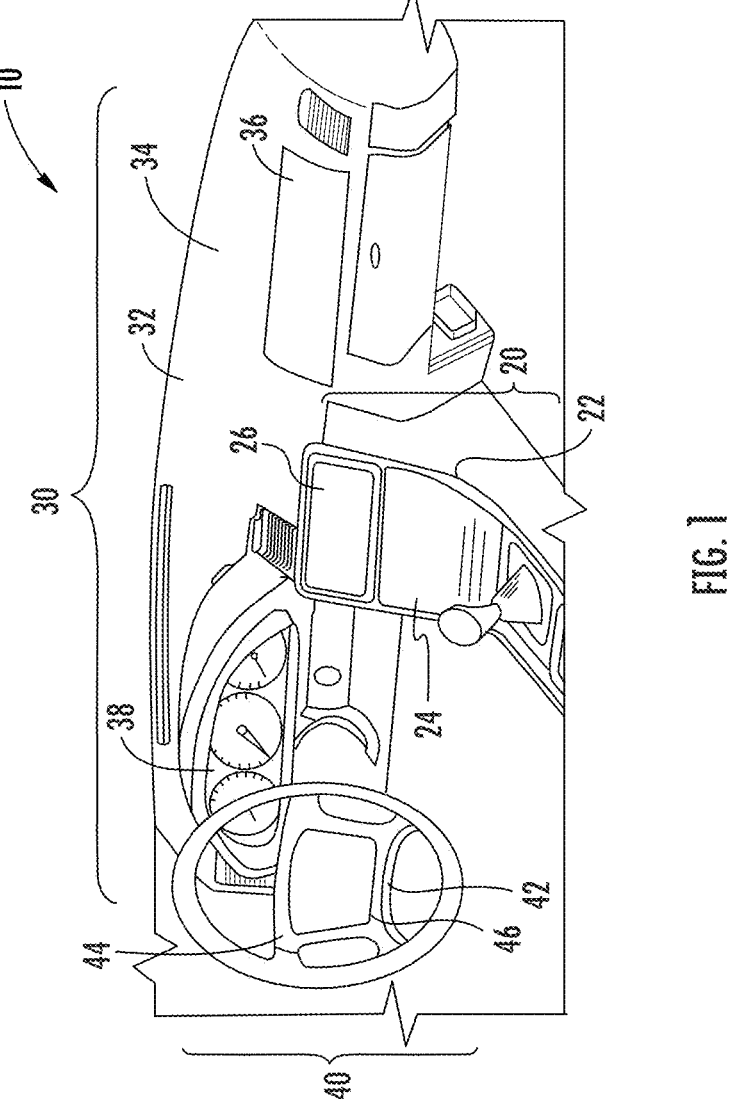
FIG. 1 is a perspective view of a vehicle interior with vehicle interior systems having glass articles, according to exemplary embodiments.

Reference will now be made in detail to various embodiments of a glass article having a glass sheet that is cold-formed into a curved configuration using magnetic force, examples of which are illustrated in the accompanying drawings. In embodiments, the glass articles described herein include a glass sheet magnetically attached to a curved frame. As will be discussed below, the frame includes cavities to hold one or more magnets or stacks of magnets that are magnetically attracted to a metal strip disposed on the glass sheet. In certain configurations, the metal strip is continuous, and the glass sheet is positioned between the frame and the metal strip. In this way, the glass sheet is secured to the frame using only the force of the magnetic attraction between the magnets of the frame and the metal strip, and no adhesives are necessary. Attaching the glass sheet in this manner provides certain advantages, including ease of disassembly for maintenance and eliminating of stresses associated with the differential thermal expansion of the glass sheet and frame in conventional glass article designs.

In other configurations, the metal strip is discontinuous, and the discontinuous metal strip is adhered to the glass sheet such that the discontinuous metal strip is disposed between the glass sheet and the frame. A glass article according to this configuration also provides the advantages associated with ease of assembly and elimination of the stresses that result from the differential in thermal expansion between the glass sheet and frame in conventional glass article designs.

In embodiments described herein, the concept of using magnetic force to bend a glass sheet is also applied just on the cold-forming process side. In particular, a glass sheet can be cold bent over a magnetic forming chuck using a metallic press. The magnetic attraction between the forming chuck and press is used to hold the glass sheet in the curved configuration while a frame is adhered to cold-bent glass sheet. Once the adhesive bond between the glass sheet and frame is sufficiently cured, the press is pulled away from the forming chuck, releasing the curved glass article. Advantageously, a cold-forming process using magnetic forces is less energy-intensive than, e.g., processes requiring a vacuum to be pulled and maintained between the glass sheet and forming chuck.

The embodiments mentioned above and described herein are provided by way of illustration and not by way of limitation.

In general, a vehicle interior system may include a variety of different curved surfaces, such as display surfaces. Forming such vehicle surfaces from a glass material provides a number of advantages compared to the typical curved plastic panels that are conventionally found in vehicle interiors. For example, glass is typically considered to provide enhanced functionality and user experience in many cover material applications, such as display applications and touch screen applications, compared to plastic cover materials.

FIG. 1 shows an exemplary vehicle interior 10 that includes three different embodiments of vehicle interior systems 20, 30, 40. Vehicle interior system 20 includes a base, shown as center console base 22, with a curved surface 24 including a display 26. Vehicle interior system 30 includes a base, shown as dashboard base 32, with a curved surface 34 including a display 36. The dashboard base 32 typically includes an instrument panel 38 which may also include a display. Vehicle interior system 40 includes a base, shown as steering wheel base 42, with a curved surface 44 and a display 46. In one or more embodiments, the vehicle interior system includes a base that is an arm rest, a pillar, a seat back, a floor board, a headrest, a door panel, or any portion of the interior of a vehicle that includes a curved surface.

The embodiments of the curved glass articles described herein can be used in each of vehicle interior systems 20, 30, 40, among others. In some such embodiments, the glass article discussed herein may include a cover glass sheet that also covers non-display surfaces of the dashboard, center console, steering wheel, door panel, etc. In such embodiments, the glass material may be selected based on its weight, aesthetic appearance, etc. and may be provided with a coating (e.g., an ink or pigment coating) including a pattern (e.g., a brushed metal appearance, a wood grain appearance, a leather appearance, a color appearance, etc.) to visually match the glass components with adjacent non-glass components. In specific embodiments, such ink or pigment coating may have a transparency level that provides for deadfront or color matching functionality when the display 26, 36, 38, 46 is inactive. Further, while the vehicle interior of FIG. 1 depicts a vehicle in the form of an automobile (e.g., cars, trucks, buses and the like), the glass articles disclosed herein can be incorporated into other vehicles, such as trains, sea craft (boats, ships, submarines, and the like), aircraft (e.g., drones, airplanes, jets, helicopters and the like), and spacecraft.

Figure 2:
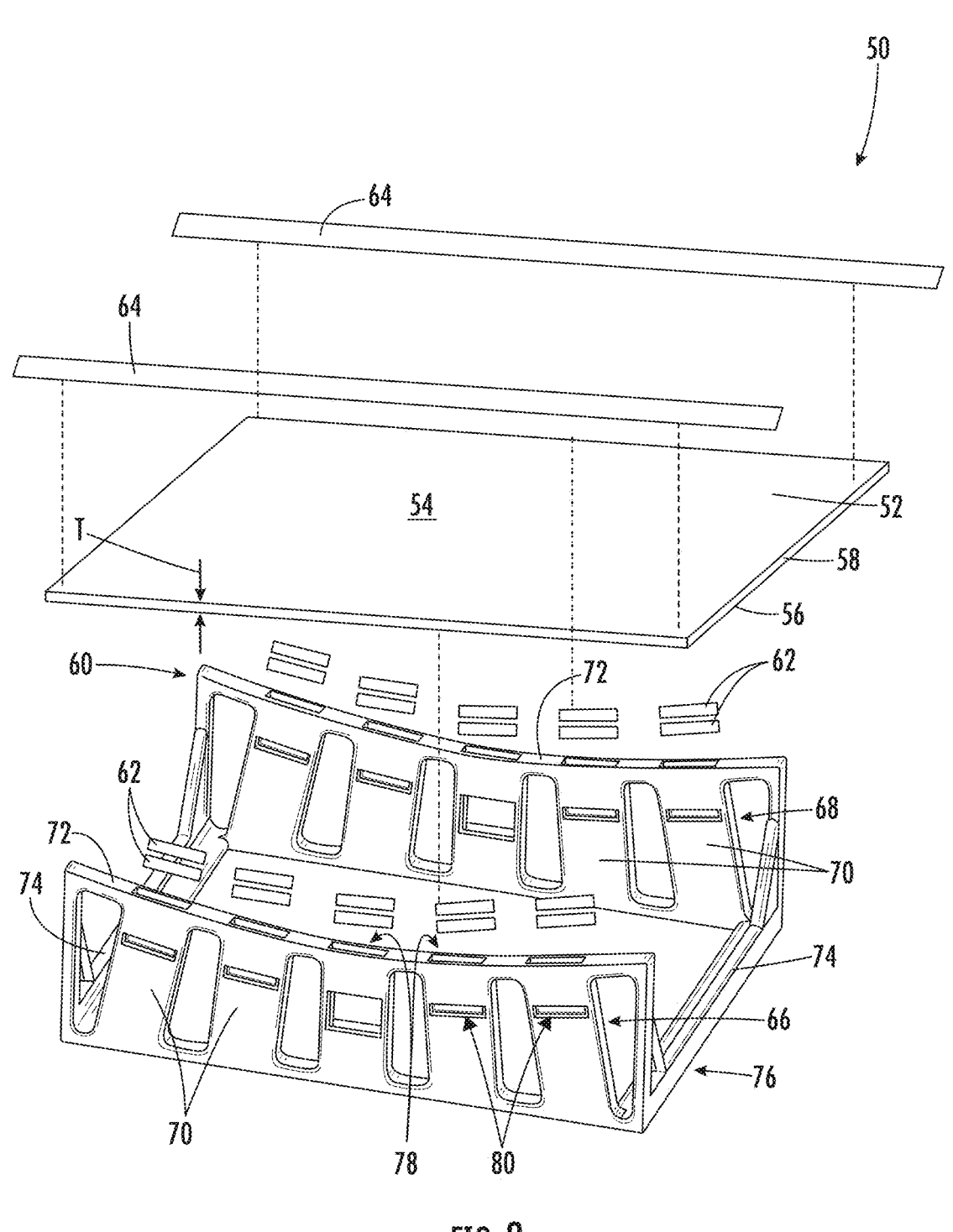
FIG. 2 is an exploded view of a curved magnetic glass article, according to an exemplary embodiment.

Referring to FIG. 2, an exploded view of a magnetic glass article 50, such as might define the curved surfaces 24, 34, 44 of the vehicle interior system 10, is depicted. The magnetic glass article 50 includes a glass sheet 52 having a first major surface 54, a second major surface 56 opposite to the first major surface 54, and a minor surface 58 joining the first major surface 54 to the second major 56. The first major surface 54 and the second major surface 56 define a thickness T of the glass sheet 52. In embodiments, the thickness T of the glass sheet 52 is from 0.3 mm to 2 mm, in particular 0.5 mm to 1.1 mm. In a vehicle, the first major surface 54 faces the occupants of the vehicle.

In embodiments, the first major surface 54 and/or the second major surface 56 includes one or more surface treatments. Examples of surface treatments that may be applied to one or both of the first major surface 54 and second major surface 56 include at least one of an anti-glare coating, an anti-reflective coating, a coating providing touch functionality, a decorative (e.g., ink or pigment) coating, or an easy-to-clean coating. Additionally, in embodiments, a display module may be bonded to the second major surface 56 of the glass sheet 52. Exemplary display modules include at least one of a light-emitting diode (LED) display, an organic LED (OLED) display, a micro-LED display, a liquid crystal display (LCD), or a plasma display.

In the magnetic glass article 50 of FIG. 2, the second major surface 56 of the glass sheet 52 is magnetically connected to a frame 60. In particular, the glass sheet 52 is attached to the frame 60 via magnetic attractive forces between a plurality of magnets 62 and one or more metal strips 64. In the embodiment depicted, the frame 60 includes a first sidewall 66 and a second sidewall 68, and each sidewall 66, 68 comprises a plurality of hollow pillars 70 configured to hold the plurality of magnets 62. The plurality of pillars 70 of each sidewall 66, 68 are joined at a first end to define a support surface 72 having a curvature. The second major surface 56 of the glass sheet 52 is disposed over the support surface 72, and as will be discussed blow, the glass sheet 52 is bent into conformity with the support surface 72. In the embodiment depicted, the pillars 70 of each sidewall 66, 68 are also joined at a second end opposite to the support surface 72. Further, in the embodiment depicted, the first sidewall 66 and the second sidewall 68 are joined by cross-members 74. The cross-members 74 and the joint between the pillars 70 of the sidewalls 66, 68 at the second end define a base 76 of the frame 60. In embodiments, the base 76 may define a planar surface of the frame 60.

As can be seen in the embodiment depicted, the pillars 70 define cavities 78 into which the plurality of magnets 62 are inserted. Further, in the embodiment depicted, each pillar 70 has one or more magnets 62 inserted therein, but in other embodiments, magnets 62 may be inserted in less than all of the pillars 70, e.g., in as few as only one pillar 70 in each sidewall 66, 68 as will be discussed in relation to embodiments provided below. Further, in the embodiment depicted, the metal strip 64 is continuous and disposed over the first major surface 54 of the glass sheet 52. However, in other embodiments (including embodiments discussed below), the metal strip 64 is discontinuous and may also be disposed on the second major surface 56 of the glass sheet 52.

It should be noted that the embodiment depicted in FIG. 2 is merely illustrative. The size, shape, and thickness of the frame 60 will be dictated, at least in part, by the particular vehicle interior system in which it is incorporated and by customer specifications. In general, the frame 60 includes a support surface 72 defining a curvature of the magnetic glass article 50 and cavities 78 into which one or more magnets 62 can be inserted to hold the glass sheet 52 in the curved shape.

Figure 3A:
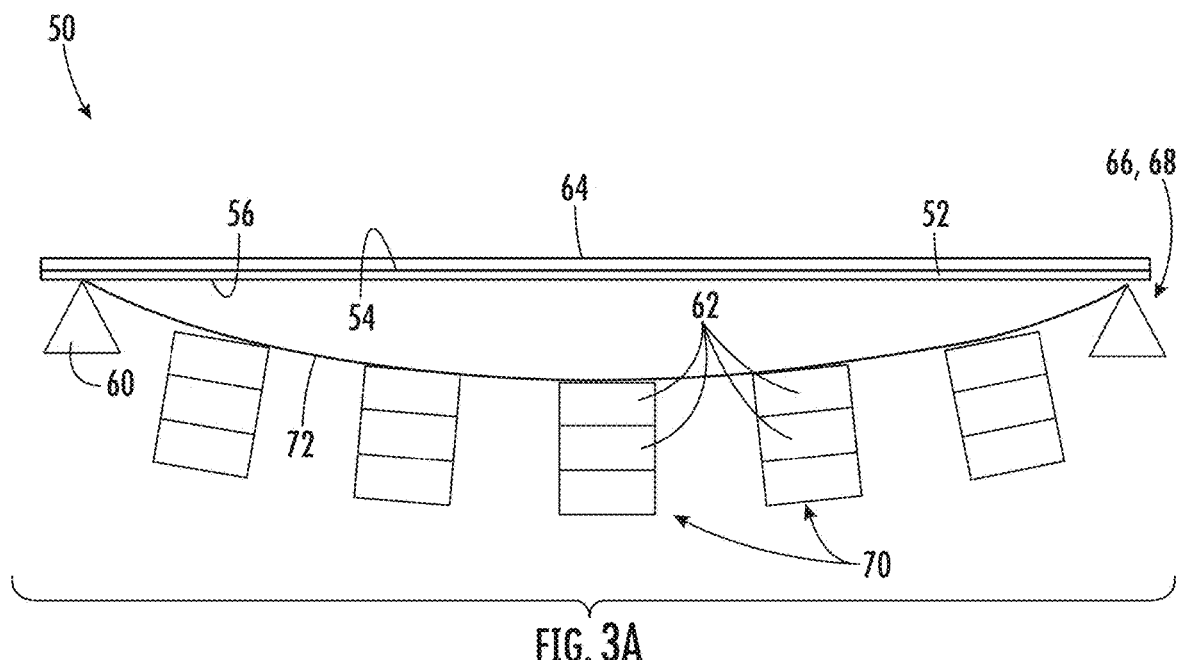
FIGS. 3A and 3B depict a schematic representation of forming a magnetic connection to curve a glass sheet, according to an exemplary embodiment.
Figure 3B:
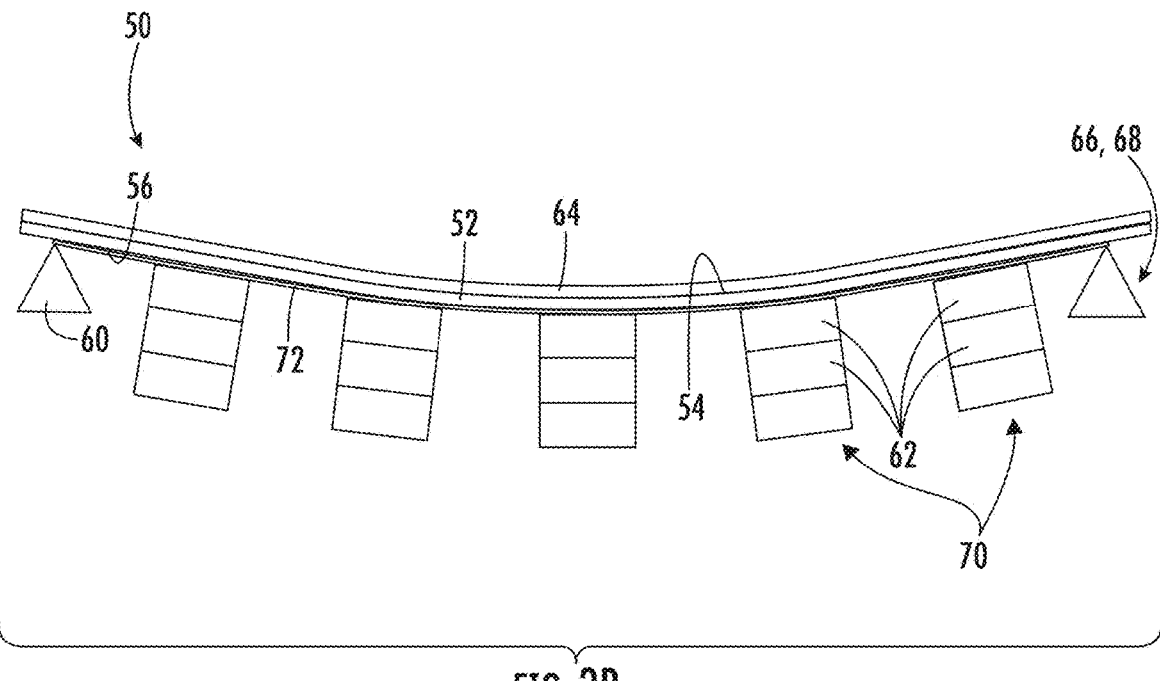

FIGS. 3A and 3B depict a schematic representation of the magnetic bending of the glass sheet 52 over the frame 60. The portion of the frame 60 shown can represent either the first sidewall 66 or the second sidewall 68 of the frame 60 shown in FIG. 2. Referring first to FIG. 3A, the glass sheet 52 is placed with the second major surface 56 disposed over the support surface 72 of the frame 60. Further, the metal strip 64 is placed on the first major surface 54 of the glass sheet 52. Pressure is applied to the first major surface 54 of the glass sheet 52 to bring the second major surface 56 into conformity with the support surface 72 as shown in FIG. 3B. The magnetic attraction between the plurality of magnets 62 (which are contained in the hollow pillars 70) and the metal strip 64 maintains the curvature of the glass sheet 52 in conformity with the support surface 72 of the frame 60 to form the magnetic glass article 50. As with the embodiment depicted in FIG. 2, the plurality of magnets 62 in the embodiment of FIGS. 3A and 3B are evenly spaced across the support surface 72. It should be noted that, while a stack of magnets 62 is shown at a plurality of bonding locations, a single magnet 62 having the same magnetic attractive force as the stack of magnets 62 could be used instead.

Figure 4:
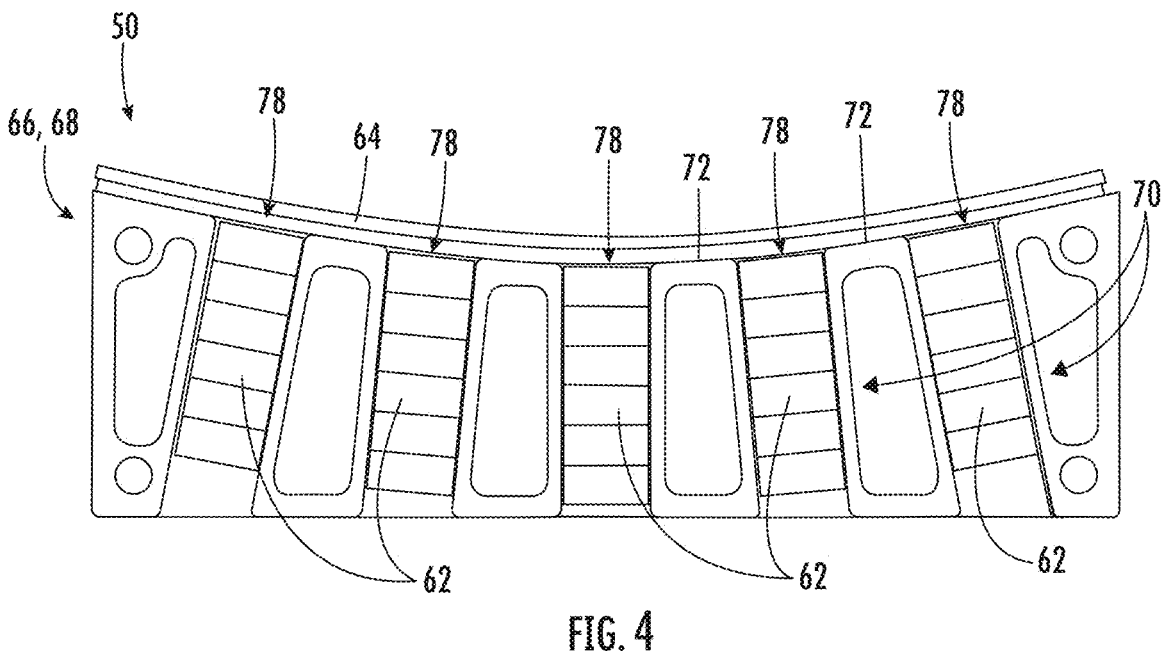
FIG. 4 depicts a sidewall of a frame having a plurality of cavities substantially filled with magnets to hold the glass sheet in a curved configuration, according to an exemplary embodiment.
Figure 5:
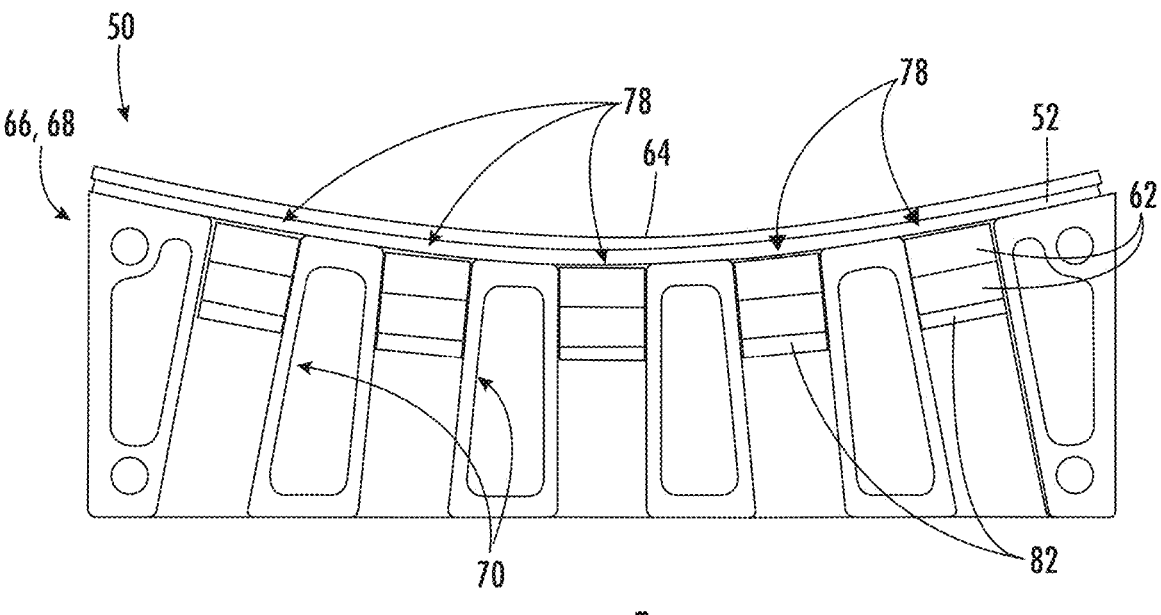
FIG. 5 depicts a sidewall of a frame having a plurality of cavities less than half-filled with magnets to hold the glass sheet in a curved configuration, according to an exemplary embodiment.

FIG. 4 depicts a cross section of a magnetic glass article 50 showing the cavities 78 of the pillars 70 filled with magnets 62. The cross-section is representative of both the first sidewall 66 and the second sidewall 68. In the embodiment depicted, the magnets 62 extend from the support surface 72 through all or a substantial portion of the pillars 70. However, as shown in FIG. 5, the magnets 62 may fill less than the entirety or substantially the entirety of each pillar 70. Thus, for example, the magnets 62 may only fill a portion of one or more of the pillars 70. Again, instead of a stack of magnets as shown in FIGS. 4 and 5, a single magnet 62 having the same magnetic attractive force as the stack of magnets 62 in each cavity 78 could be used. Further, in embodiments, the frame 60 and cavities 78 of the pillars 70 are sized and shaped to accommodate the magnet or magnets 62 that will be used to form the magnetic glass article 50.

Figure 6:
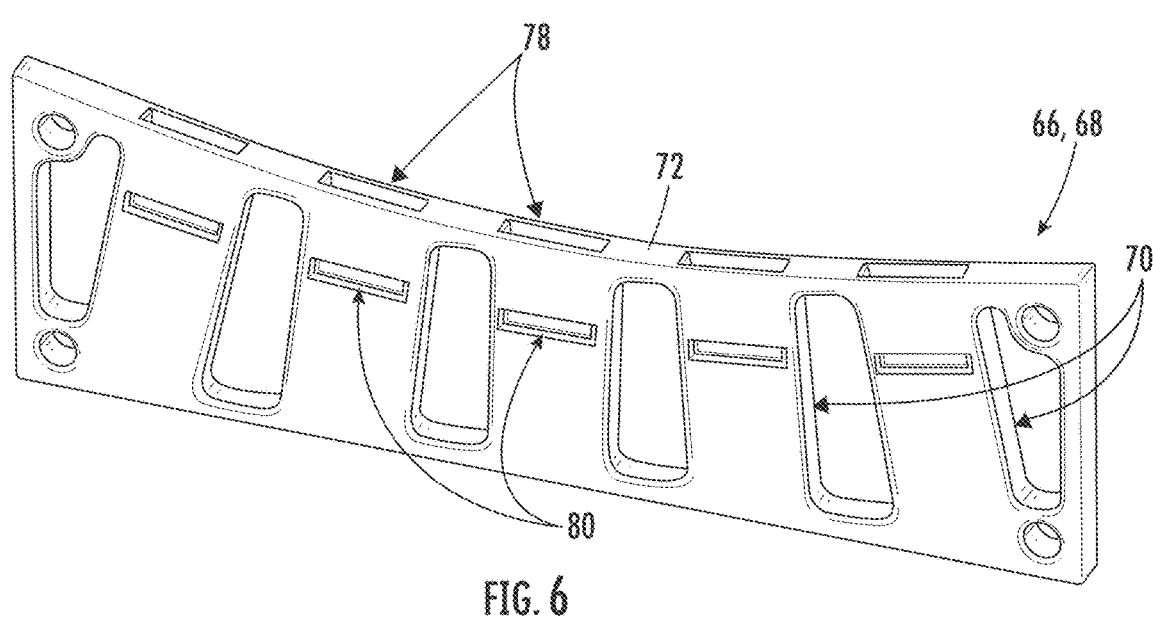
FIG. 6 depicts a sidewall of a frame having a plurality of cavities and a slot for holding a stopper for positioning the magnets, according to exemplary embodiments.

In an embodiment, such as the embodiment shown in FIG. 6, the sidewall 66, 68 may include a slot 80 formed in the pillar 70 into which a stopper 82 (as shown in FIG. 5) may be inserted to hold the magnets 62 at the level of the support surface 72. For example, as shown in FIG. 5, the first two magnets 62 in the cavities 78 of each pillar 70 are held in place at the level of the support surface 72 by a third magnet 62 used as the stopper 82. In particular, the first two magnets 62 may each be rectangular blocks shaped to slide through the cavities 78 of the pillar 70, and the third magnet 62 may be a thin cylindrical disk inserted through the slot 80 to act as a stopper 82 to prevent the first two magnets from sliding through the cavity 78 of the pillar 70. In this regard, the number of magnets 62 can be varied depending on the type of magnet 62 used and the force necessary to hold the glass sheet 52 in the curved configuration against the frame 60.

In an embodiment, the magnets 62 are permanent magnets. In embodiments, the permanent magnets include at least one of AlNiCo magnets, ferrite magnets, neodymium (NdFeB) magnets, or samarium cobalt magnets. In an embodiment, the magnets 62 are rectangular blocks having, e.g., a length of 10 mm to 30 mm, a width of 2 mm to 10 mm, and a thickness of 1 mm to 5 mm. In an embodiment, the magnet 62 used as the stopper 82 may are cylindrical disks having a diameter of from 10 mm to 30 mm and a thickness of from 1 mm to 5 mm. In general, the stacked magnets 62 will act as one larger magnet, thereby increasing the magnetic field strength and pull force. Thus, in embodiments, instead of multiple magnets 62 arranged in a stack, a single larger magnet 62 may be used. Additionally, in embodiments, the stopper 82 is not a magnet 62 and is instead a plug, e.g., of rubber material inserted into the cavity 78 of each pillar 70. Further, as previously mentioned, the cavity 78 may instead be sized to receive a specific number of magnets 62 or a magnet 62 of a particular size so that a stopper 82 is not needed. Further, in embodiments, the magnet 62 or magnets 62 are instead glued into the cavity 78 so that a stopper 82 is not needed.

Figure 7:
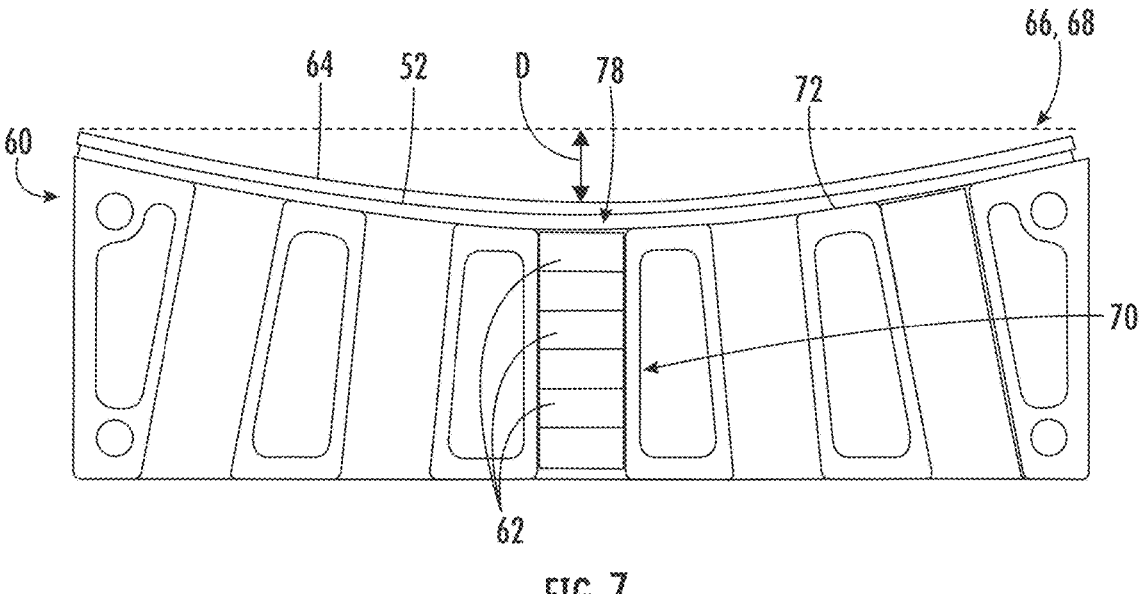
FIG. 7 depicts a sidewall of a frame having one cavity of a pillar filled with magnets for holding the glass sheet in the curved configuration, according to exemplary embodiments.

Further, in embodiments, each sidewall 66, 68 may include only a single pillar 70 having a cavity 78 containing a magnet 62 or magnets 62 as shown in FIG. 7. As can be seen in FIG. 7, the support surface 72 defines a curvature of, e.g., from 50 mm to a curvature that is less than substantially flat or planar (e.g., R=5 m). The attractive force between the magnet(s) 62 and the metal strip 64 are configured to impart the curvature of the support surface 72 to the glass sheet 52. In this way, the glass sheet 52 will deflect from planar with the maximum deflection D being at the center of the curvature the glass sheet 52. Applicant has found that a magnet 62 or magnets 62 placed at the center of the curvature proximal to location of maximum deflection D of the glass sheet 52 can, in certain circumstances, be sufficient to maintain the curvature of the entire glass sheet 52 against the support surface 72 of the frame 60. For example, two stacks of seven neodymium magnets having the dimensions of 20 mm×5 mm×3 mm arranged at the center of curvature provides about 160 N of pulling force, which as discussed below is sufficient to maintain the curvature of the glass sheet 52 against the frame 60.

Figure 8A:
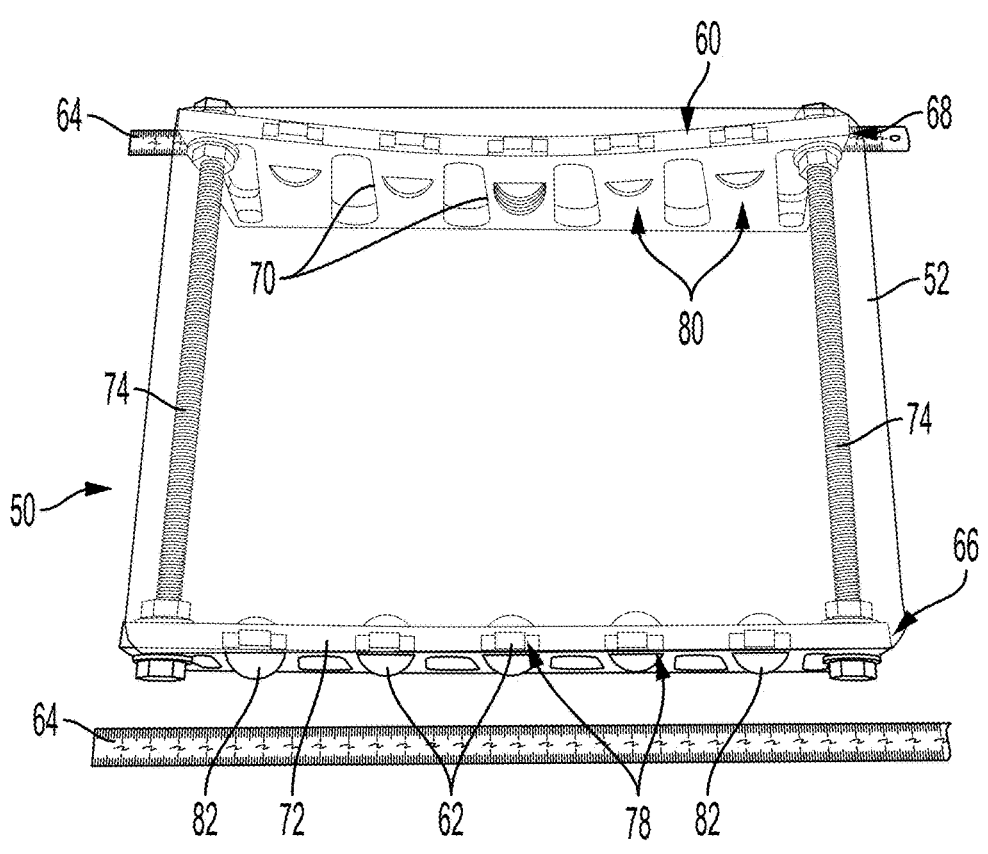
FIGS. 8A-8C depict a process of bending a glass sheet to a frame using magnetic force, according to exemplary embodiments.
Figure 8B:
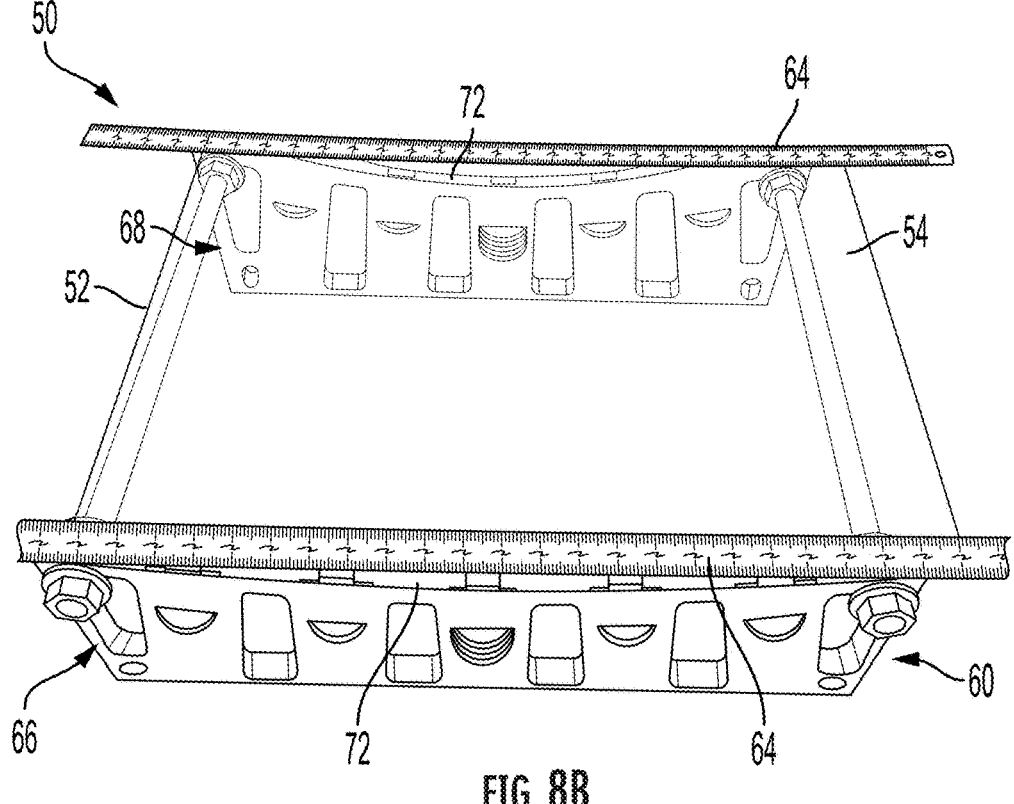
Figure 8C:
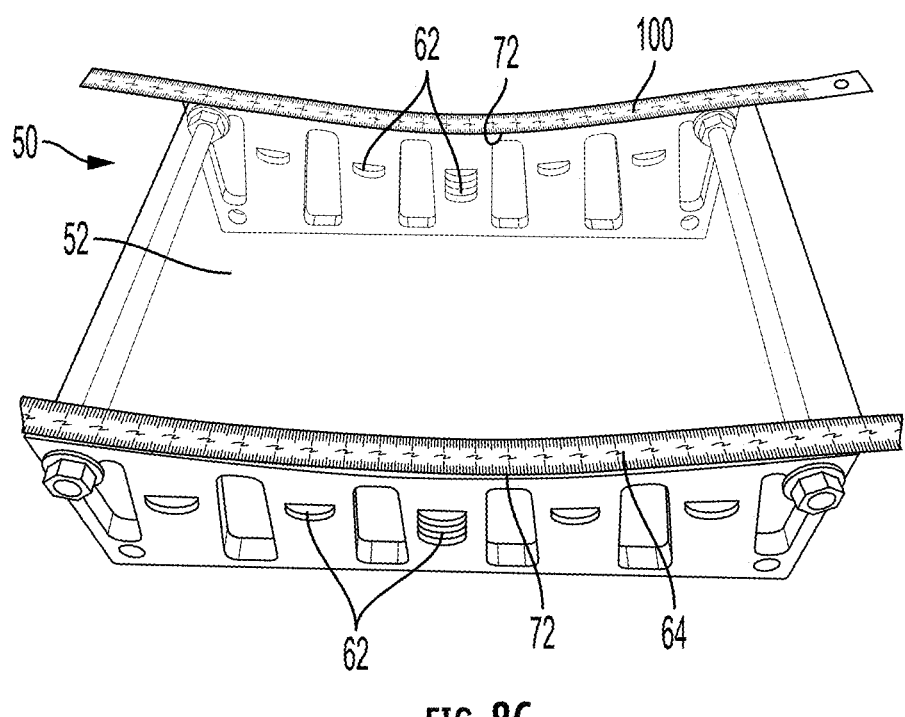

FIGS. 8A-8C depict a method of assembling the magnetic glass article 50. As can be seen in FIG. 8A, the glass sheet 52 is positioned over the support surface 72 of the frame 60. The sidewalls 66, 68 are connected by cross-members 74. In the experimental embodiment shown in FIG. 8A, the cross-members 74 are threaded rods bolted to each sidewall 66, 68 to define the width of the frame 60. The pillars 70 of the sidewalls 66, 68 include cavities 78 filled with magnets 62. In the experimental embodiment depicted, each pillar 70 includes a slot 80 having circular disk magnets 62 (20 mm×2 mm) acting as stoppers 82. Positioned within the cavities 78 over the stopper 82 magnets 62 are a plurality of rectangular block magnets 62 (20 mm×5 mm×3 mm). At the level of the support surface 72, each pillar 70 includes one magnet 62 having the dimensions of 10 mm×5 mm×5 mm. All of the magnets 62 used were neodymium magnets. Further, in the experimental embodiment, the metal strips 64 used were steel having a thickness of 0.5 mm and a width of 10 mm. The glass sheet 52 was an ion-exchanged glass (Gorilla® glass 9642, available from Corning Incorporated, Corning, NY) having a thickness of 0.55 mm and dimensions of 235 mm×185 mm.

As shown in FIG. 8B, the metal strips 64 are positioned over the first major surface 54 of the glass sheet 52 and over the support surface 72 of each sidewall 66, 68. As can be seen in FIG. 8B, the glass sheet 52 is still planar over the frame 60. As shown in FIG. 8C, pressure is applied to the glass sheet 52 and metal strips 64 to bring the metal strips 64 in close enough proximity to the magnets 62 to create a magnetic attractive force between the metals strips 64 and the magnets 62, which holds the glass sheet 52 in conformity with the curvature of the support surface 72, creating the curved magnetic glass article 50. In the experimental embodiment, the glass sheet 52 was imparted with a radius of curvature of 416.6 mm, which corresponds to a maximum deflection from planar of 15 mm.

Figure 9A:
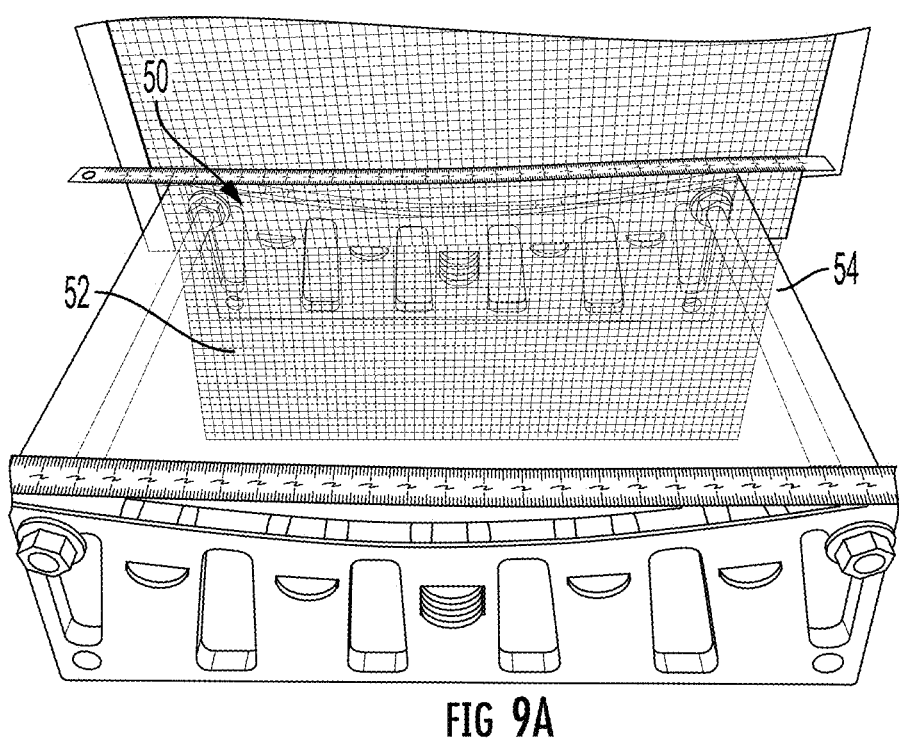
FIGS. 9A and 9B depict a curved magnetic glass article prior to and after bending of the glass sheet using grid lines to demonstrate the curvature in the glass sheet, according to exemplary embodiments.
Figure 9B:
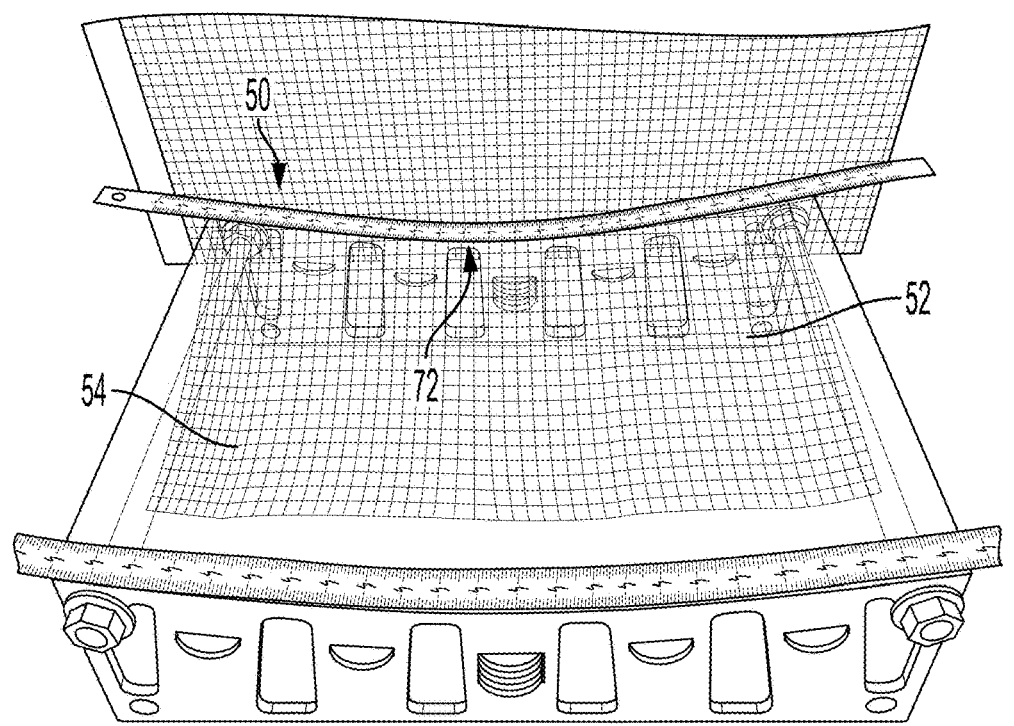

FIGS. 9A and 9B depict the glass articles 50 of FIGS. 8B and 8C, i.e., prior to bending and after bending of the glass sheet 52. Graph paper was placed perpendicularly near the glass article 50 so that the curvature could be demonstrated in the reflection from the first major surface 54 of the glass sheet 52. Referring first to FIG. 9A, the grid lines of graph paper in the reflection from the first major surface 54 of the planar glass sheet 52 remain substantially perpendicular. In FIG. 9B, the grid lines of the graph paper in the reflection from the first major surface 54 of the curved glass sheet 52 can be seen to follow the curvature imparted by the support surface 72.

Figure 10:
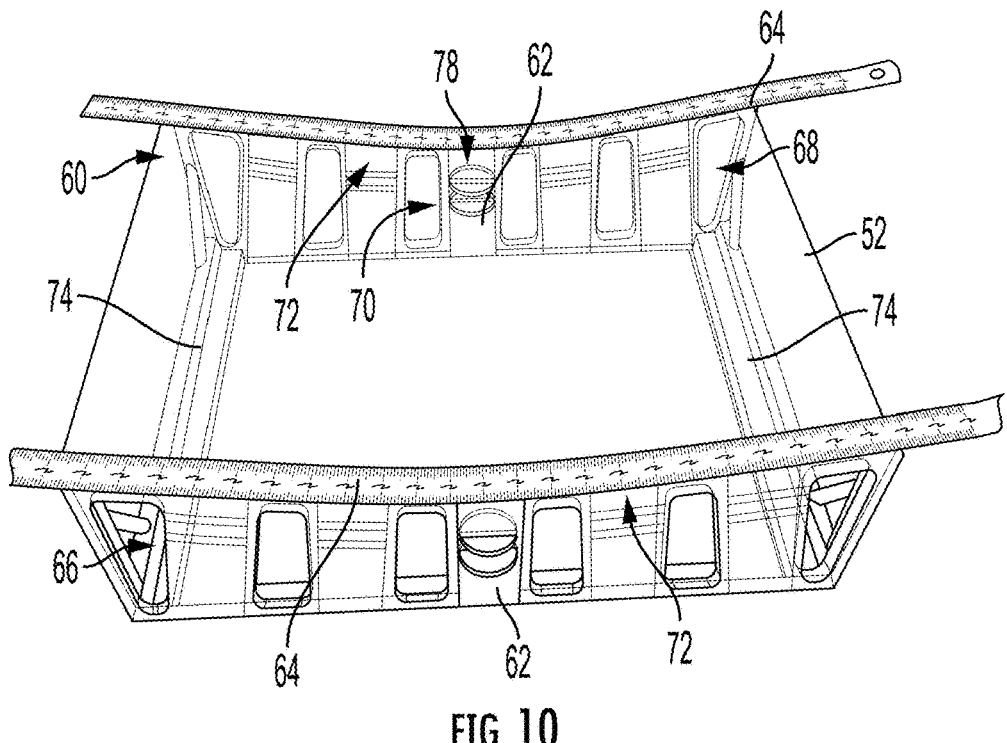
FIG. 10 depicts a curved magnetic glass article having a plurality of magnets stacked in a single pillar of each sidewall of the frame, according to exemplary embodiments.

FIG. 10 depicts another experimental embodiment substantially similar to the embodiment shown in FIGS. 8A-8C. In FIG. 10, the frame 60 included sidewalls 66, 68 and cross-members 74 created by stereolithography. The radius of curvature of the support surface 72 was 416.6 mm. In contrast to the embodiment of FIGS. 8A-8C, the embodiment of FIG. 10 included magnets 62 only in the cavities 78 of the central pillars 70 of each of the first and second sidewalls 66, 68 (i.e., in the region where the maximum deflection of the glass sheet 52 is located). As can be seen, the magnets 62 and metal strip 64 retain the glass sheet 52 in the curved configuration against the support surface 72 even though they are located only in one pillar 70 of each sidewall 66, 68 of the frame 60.

Figure 11A:
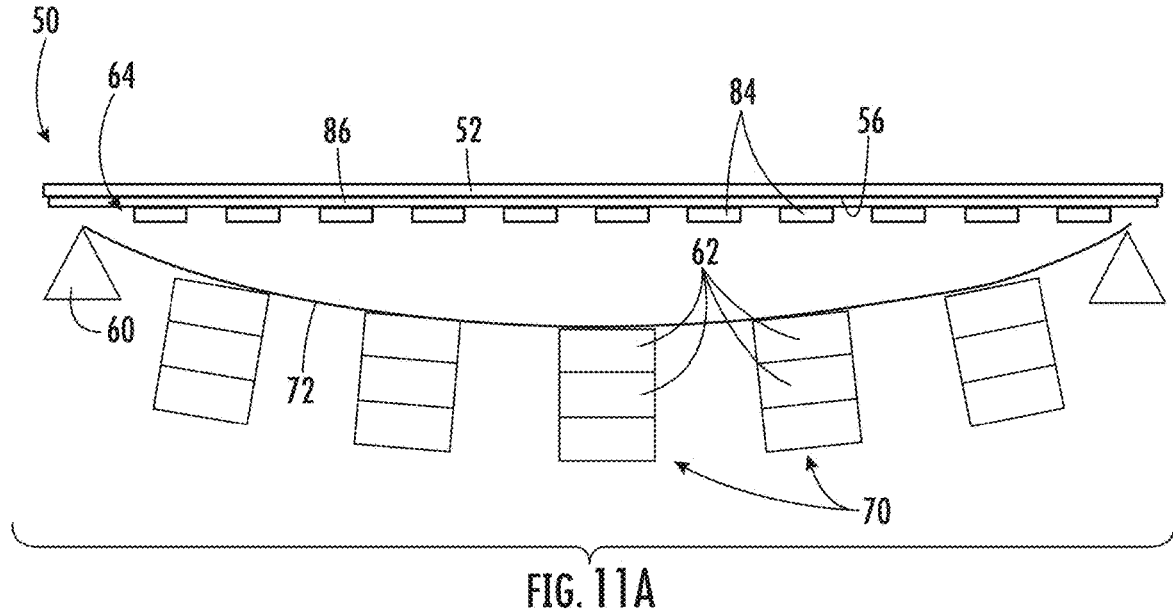
FIGS. 11A and 11B depict a curved magnetic glass article having a discontinuous metal strip used to hold the glass sheet in the curved configuration, according to an exemplary embodiment.
Figure 11B:
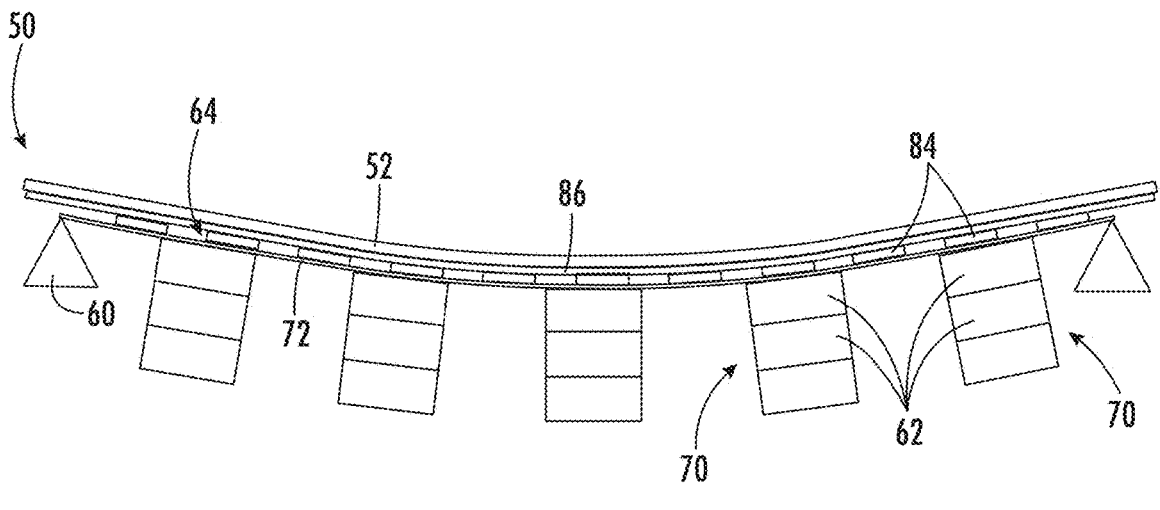

FIGS. 11A and 11B depict another embodiment of the curved magnetic glass article 50. Referring first to FIG. 11A, the glass sheet 52 includes a discontinuous metal strip 64 adhered to the second major surface 56 of the glass sheet 52. The discontinuous metal strip 64 includes a plurality of metal foils 84 joined to the second major surface 56 of the glass sheet 52 with an adhesive layer 86. In embodiments, the metal foils 84 have a length of 15 mm to 25 mm, width of 2 mm to 10 mm, and a thickness of 0.25 mm to 2.0 mm, and the space between metal foils 84 is 10 mm to 50 mm. In embodiments, the adhesive layer 86 comprises at least one of a toughened epoxy, a flexible epoxy, an acrylic, a silicone, a urethane, a polyurethane, a pressure-sensitive adhesive, or a silane-modified polymers. In a particular embodiment, BETASEAL 1965 polyurethane glue was used along with BETAPRIME 5405 adhesion primer to bond the metal foils 84 to the glass sheet 52. In embodiments, the adhesive layer 86 has a thickness of 2.0 mm or less between the metal foils 84 and the glass sheet 52.

When assembling the curved magnetic glass article 50, the second major surface 56 of the planar glass sheet 52 is disposed over the support surface 72 of the frame 60. In the embodiment of FIG. 11A, the frame 60 includes stacks of magnets 62 evenly distributed across the support surface 72. In other embodiments, a single equivalent magnet 62 is provided in place of one or more of the stacks of magnets 62. Pressure is applied to the glass sheet 52, which brings metal foils 84 of the discontinuous metal strip 64 into magnetic attraction with the magnets 62, and the glass sheet 52 conforms to the support surface 72 of the frame 60 as shown in FIG. 11B. In embodiments, the metal strip 64 is made discontinuous in order to prevent thermal stresses from developing as a result of the differential in the coefficients of thermal expansion in the glass sheet 52 and the metal foils 84. That is, during thermal cycling, a continuous metal strip adhesively attached to the glass sheet could cause thermal stress in the adhesive layer as a result of differences in thermal expansion between the glass sheet and metal strip. If the stresses become too high, the adhesive layer could fail, leading to delamination of the glass sheet from the metal strip. By breaking the metal strip 64 up into a plurality of metal foils 84, the metal foils 84 are provided with space to expand without being able to generate enough stress to rupture the adhesive layer 86.

Figure 12A:
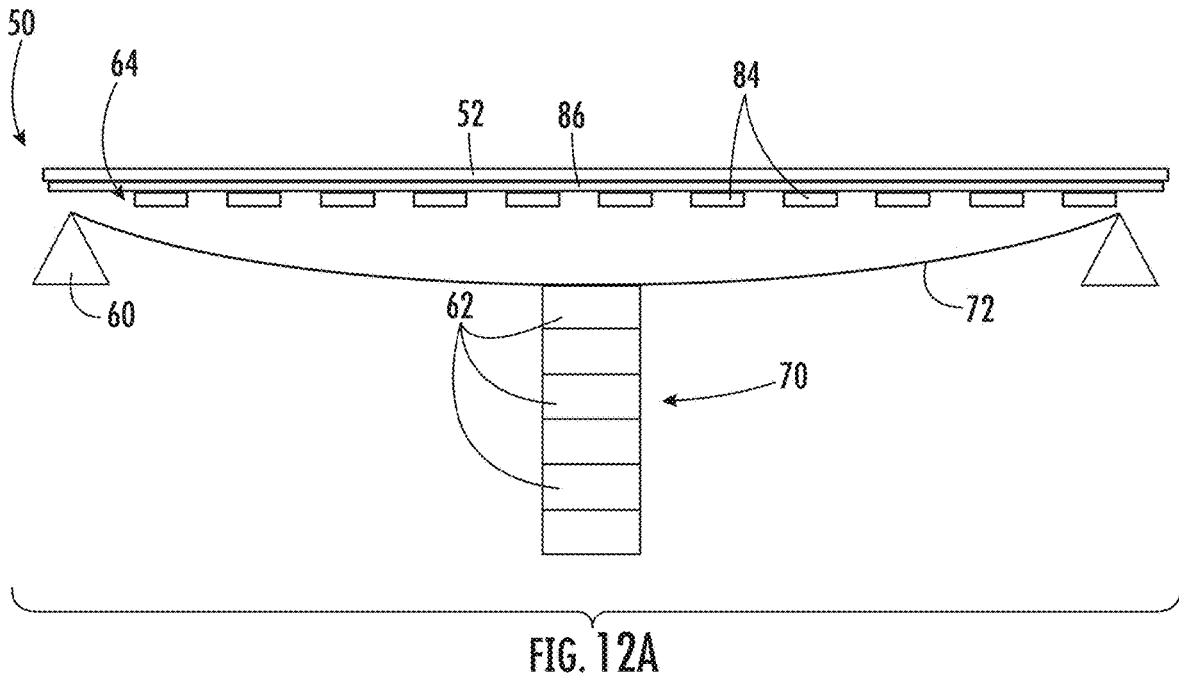
FIGS. 12A and 12B depict a curved magnetic glass article having a discontinuous metal strip and a frame having a stack of magnets arranged in a single pillar, according to an exemplary embodiment.
Figure 12B:
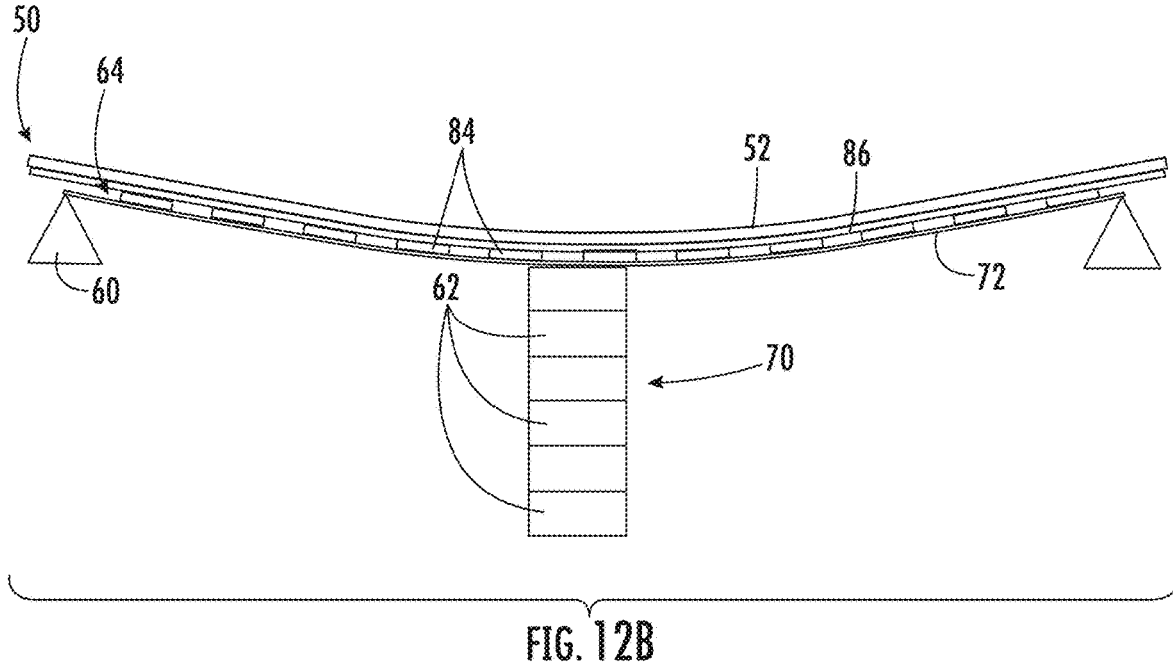

FIGS. 12A and 12B depict an embodiment substantially similar to the embodiment of FIGS. 11A and 11B with the exception that the embodiment of FIGS. 12A and 12B utilizes a single stack of magnets 62 (or a single equivalent magnet 62) located at the region of the support surface 72 corresponding to maximum deflection for the curved glass sheet 52. As with the prior embodiments discussed above and shown in the figures (e.g., FIGS. 7 and 10), the single stack of magnets 62 in the region of maximum deflection is sufficient to hold the glass sheet 52 in the cold configuration using the discontinuous metal strip 64. Further, in embodiments, the discontinuous metal strip 64 only includes metal foils 84 in the region of the magnet(s) 62. In such embodiments, the support surface 72 may include a countersunk region or a depression for receiving the metal foils 84 in order to prevent the metal foils 84 from creating a disruption in the curvature relative to the rest of the second major surface 56 in contact with the support surface 72.

FIGS. 13A-13C depict another embodiment of the magnetic glass article 50. In this embodiment, the curvature is the opposite to the curvature of what has been depicted in the previous embodiments. In particular, the previous embodiments all consider a convex curvature with respect to the second major surface 56, whereas the embodiment of FIGS. 13A-13C depicts a concave curvature with respect to the second major surface 56. As shown in FIG. 13A, the magnets 62 are placed at lateral edges of the support surface 72 of the frame 60. As can be seen in FIG. 13B, the magnets 62 hold the glass sheet 52 in the curved configuration based on magnetic attraction between the magnets 62 and metal strip 64, but as shown in FIG. 13C, the magnets 62 and metal strip 64 are not arranged along the curvature defined by the frame 60. Instead, the magnets 62 and metal strip 64 are arranged perpendicular to the curvature defined by the frame 60. In this way, the metal strip 64 is not curved with the glass sheet 52 as in the previous embodiments. Similarly, the magnets 62 are not spread over the curvature or disposed at the region of maximum displacement but are arranged along the lateral edges of the glass sheet 52.

In foregoing embodiments, the glass sheet 52 is formed in such a way that the curvature is not permanent. That is, the glass sheet 52 is deformed elastically and would spring back to a planar, non-curved (i.e., flat) configuration if the glass sheet 52 was not bent into conformity with the support surface 72 by the magnetic attraction between the (continuous or discontinuous) metal strip 64 and the magnets 62. Thus, the glass sheet 52 is stressed to produce the curvature and remains stressed during the life of the glass article 50. In embodiments, the process of bending the glass sheet 52 into conformity with the support surface 72 of the frame 60 is a cold-forming or cold-bending process in that the bending is performed at a temperature less than the softening temperature of the glass sheet 52, in particular at a temperature of 200° C. or less, 150° C. or less, 100° C. or less, at 50° C. or less, or at about room temperature (i.e., about 20° C.). Advantageously, it is easier to apply surface treatments to a flat glass sheet 52 prior to creating the curvature in the glass sheet 52, and cold-forming allows the treated glass sheet 52 to be bent without destroying the surface treatment (as compared to the tendency of high temperatures associated with hot-forming techniques to destroy surface treatments, which requires surface treatments to be applied to the curved article in a more complicated process).

Figure 14:
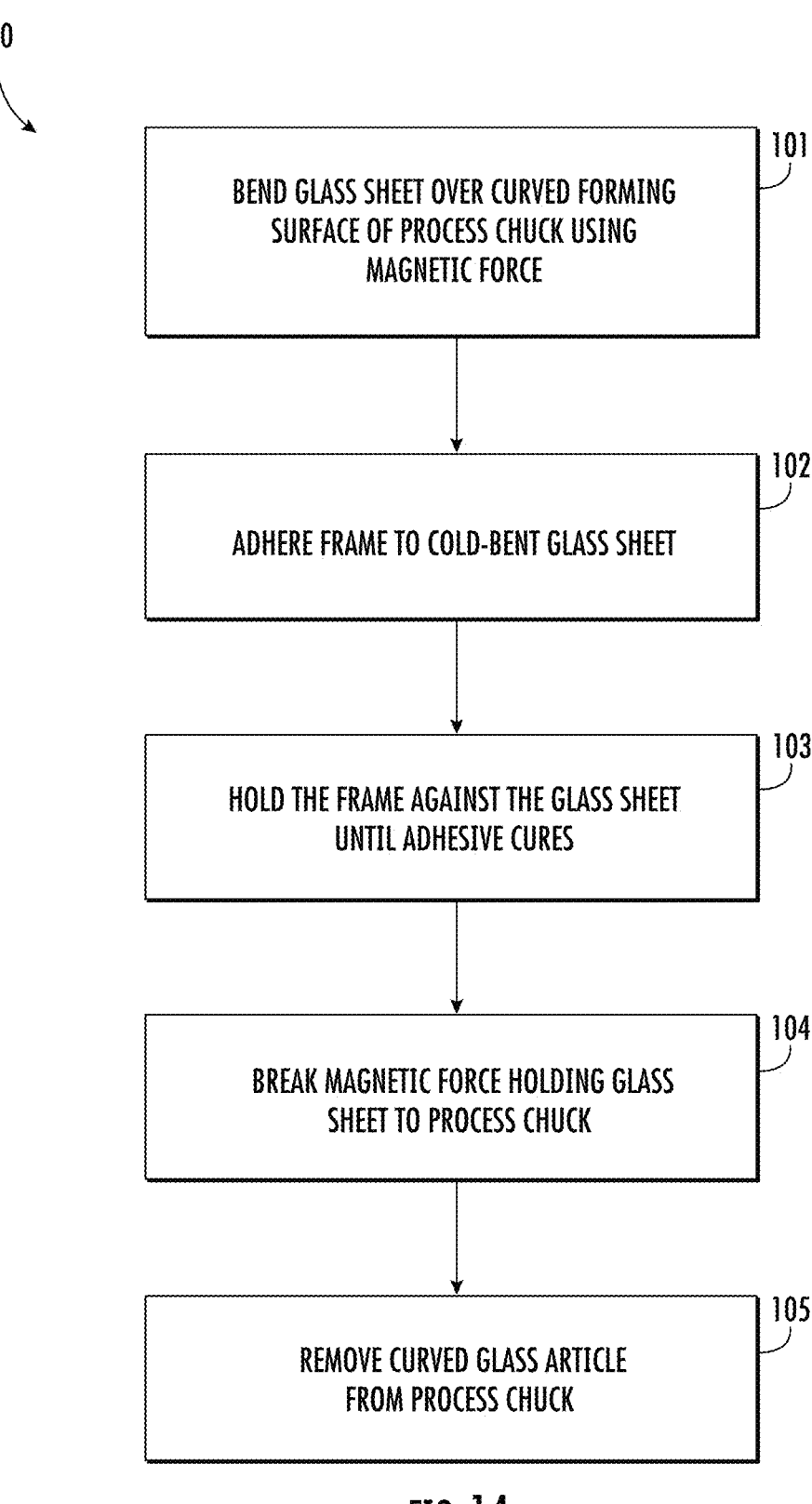
FIG. 14 is a flow diagram of a method of cold-forming a curved glass article using magnetic forces on a process chuck, according to an exemplary embodiment.

In other embodiments, magnetic forces can be used to cold-form a glass article on a process chuck as described in the method 100 shown in the flow diagram of FIG. 14. In contrast to the magnetic curved glass article, the curved glass article made according to the method 100 is held in the cold-formed configuration by an adhesive connection between the glass sheet and the frame. In a first step 101 of the method 100, the glass sheet is bent over a process chuck having a curved forming surface. The process chuck includes one or more strips of a magnetic material, and the glass sheet is pressed against the forming surface using a metallic press. The magnetic attraction between the metallic press and the magnetic material in the forming surface provides the bending force necessary to cold-bend the glass sheet over the forming surface. In other embodiments, the press may comprise the magnetic material, and the process chuck may comprise the metallic material. Further, in the method 100, the metallic material of the process chuck may be an electromagnet or a permanent magnet.

In a second step 102, a frame is adhered to the cold-bent glass sheet. In embodiments, the frame may be substantially as described herein; although, because the frame does not need to hold any magnets, the height and thickness of the frame (e.g., sidewalls) may be substantially reduced. A bead of adhesive is applied to either the frame or the glass sheet, and the frame is pressed against the glass sheet. In a third step 103, the frame is held against the glass sheet until the adhesive cures. During this time, the glass sheet is held in the curved configuration by the magnetic force between the magnetic material of the process chuck and the metallic material of the press (or vice versa). After the adhesive cures sufficiently, the magnetic attraction between the press and the process chuck is broken in a fourth step 104. This may be done in the case of an electromagnet by deactivating the electromagnet, and in the case of a permanent magnet, the press may be pulled with sufficient force to overcome the magnetic attraction between the press and the process chuck. In a fifth step 105, the curved glass article is removed from the process chuck.

Having described a magnetic glass article and a method of cold-forming a glass article using magnetic forces, the force applied to a glass sheet in order bend it to a desired curvature is considered. In calculating the bending force, a rectangular plate made of a homogeneous isotropic elastic material and having sides dimensions a and b, and a thickness t, such as $$\frac{a}{t} > 10 \text{ and } \frac{b}{t} >$$

Figure 15:
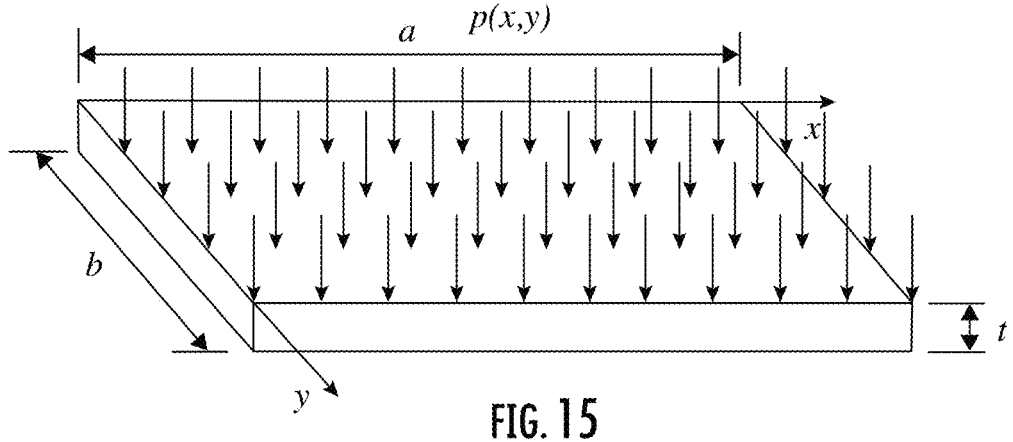
FIGS. 15 and 16 depict forces acting on a glass sheet used for the purposes of calculating the force required to bend a glass sheet using magnets, according to an exemplary embodiment.

10 was considered. For the calculations, the plate is simply supported on all edges and subjected to a uniform load p(x, y) applied to the plate upper surface. The origin of the coordinates is placed at the upper left corner as shown in FIG. 15.

In general, the stress components vary from a material point to another in a loaded plate. These variations are governed by the static conditions of equilibrium or the Lagrangian equilibrium equation. For a thin plate subjected to a flexural loading, the Lagrange equilibrium equation for the deflections (d) is given by the flowing fourth order linear partial differential equation:

$$\nabla^2\left(\nabla^2 d(x, y)\right) = \nabla^4 d(x, y) = \frac{\partial^4 d}{\partial x^4} + 2\frac{\partial^4 d}{\partial x^2 \partial y^2} + \frac{\partial^4 d}{\partial y^4} = \frac{p(x, y)}{D} \quad (1)$$

Where D is the plate flexural rigidity given by:

$$D = \frac{Et^3}{12\left(1 - v^2\right)} \quad (2)$$

The boundary conditions for a simply supported plate are the following:

$$d = 0|_{x=0,a};\ \frac{\partial^2 d}{\partial x^2} = 0|_{x=0,a} \text{ and } d = 0|_{y=0,b};\ \frac{\partial^2 d}{\partial y^2} = 0|_{y=0,b} \quad (3)$$

In this case, the Navier solution of the governing differential equation (1), i.e., the expressions of the deflection surface d(x, y) and the distributed surface load p(x, y) are deduced in the form of an infinite Fourier series, as follows:

$$d\ (x, y) = \sum_{m=1}^{\infty}\sum_{n=1}^{\infty} d_{mn}\ \sin\frac{m\pi x}{a}\sin\frac{n\pi y}{b} \quad (4)$$

$$p\ (x, y) = \sum_{m=1}^{\infty}\sum_{n=1}^{\infty} p_{mn}\ \sin\frac{m\pi x}{a}\sin\frac{n\pi y}{b} \quad (5)$$

where $d_{mn}$ and $p_{mn}$ represent coefficients to be determined. It can be verified that the expression for deflections (equation (4)) automatically satisfies the prescribed boundary conditions (equation (3)). By considering a general load configuration, the Fourier coefficients $p_{mn}$ and $d_{mn}$ can be identified as well as the equation of the deflected surface:

$$d\ (x,\ y) = \frac{1}{\pi^4 D} \sum_{m=1}^{\infty} \sum_{n=1}^{\infty} \frac{p_{mn}}{\left[(m/a)^2 + (n/b)^2\right]^2} \sin\frac{m\pi x}{a}\sin\frac{n\pi y}{b} \tag{6}$$

Where $p_{mn}$ is given by:

$$p_{mn} = \frac{4}{ab} \int_0^a \int_0^b p(x,\ y)\sin\frac{m\pi x}{a}\sin\frac{n\pi y}{b}dxdy \tag{7}$$

Figure 16:
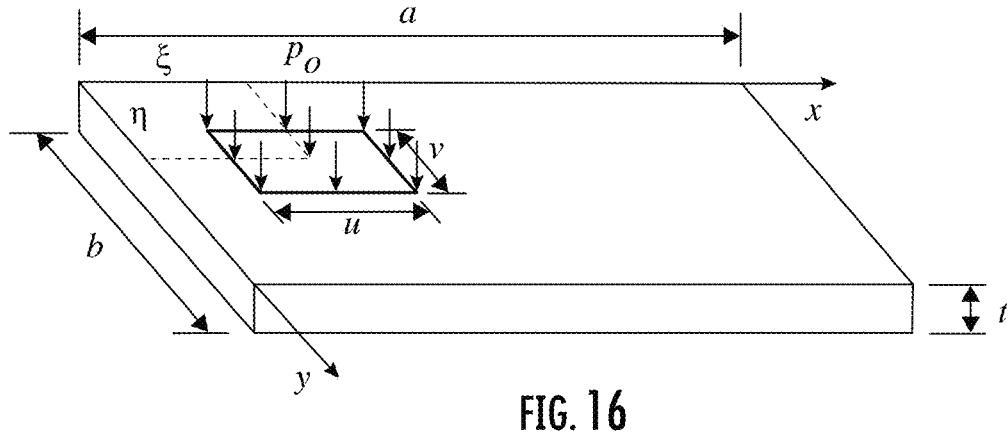

FIG. 16 considers the case of a rectangular plate simply supported on all edges of sides a and b and thickness t subjected to a uniformly distributed force $p_0$ over a contact area of sides u and v which center is located at $\xi$ and $\eta$ coordinates. The constant of the Fourier expansion of the load is:

$$p_{mn} = \frac{4p_0}{uv} \int_{\xi-\frac{u}{2}}^{\xi+\frac{u}{2}} \int_{\eta-\frac{v}{2}}^{\eta+\frac{v}{2}} \sin\frac{m\pi x}{a}\sin\frac{n\pi y}{b}dxdy \tag{8}$$

Then, $$p_{mn} = \frac{16p_0}{\pi^2 mn}\sin\frac{m\pi\xi}{a}\sin\frac{n\pi\eta}{b}\sin\frac{m\pi u}{2a}\sin\frac{n\pi v}{2b} \tag{9}$$

By inserting the above equation into equation (6), the following double series expression of the deflected surface:

$$d\ (x,\ y) = \frac{16p_0}{\pi^6 D} \sum_{m=1}^{\infty} \sum_{n=1}^{\infty} \frac{\sin\frac{m\pi\xi}{a}\sin\frac{n\pi\eta}{b}\sin\frac{m\pi u}{2a}\sin\frac{n\pi v}{2b}\sin\frac{m\pi x}{a}\sin\frac{n\pi y}{b}}{mn\left[(m/a)^2 + (n/b)^2\right]^2} \tag{10}$$

The equation converges relatively fast if the dimensions u and v are not too small. In general, taking the first four terms of the series are sufficient to calculate an accurate deflection value d(x, y). Equation (10) shows that the plate displacement depends on the contact zone area dimensions (u and v) and on the loading localization ($\xi$, $\eta$).

In the case of a concentrated force P applied at the coordinate ($\xi$, $\eta$), u→0 and v→0, and thus the expression of the deflected surface (equation (10)) becomes:

$$d\ (x,\ y) = \frac{4P}{\pi^4 Dab} \sum_{m=1}^{\infty} \sum_{n=1}^{\infty} \frac{\sin\frac{m\pi\xi}{a}\sin\frac{n\pi\eta}{b}\sin\frac{m\pi x}{a}\sin\frac{n\pi y}{b}}{\left[(m/a)^2 + (n/b)^2\right]^2} \tag{11}$$

For the case of a concentrated force at the plate center $\xi=a/2$ and $\eta=b/2$, then for even m and n, all the numbers $p_{mn}$ are zero. For odd numbers, the following can be derived from equation (11):

$$p_{mn} = \frac{4P}{ab}\sin\frac{m\pi}{2}\sin\frac{n\pi}{2} \tag{12}$$

The deflected middle surface equation (11) in this case becomes:

$$d\ (x,\ y) = \frac{4P}{\pi^4 Dab} \sum_{m=1,3,\dots}^{\infty} \sum_{n=1,3,\dots}^{\infty} \frac{\sin\frac{m\pi}{2}\sin\frac{n\pi}{2}\sin\frac{m\pi x}{a}\sin\frac{n\pi y}{b}}{\left[(m/a)^2 + (n/b)^2\right]^2} \tag{13}$$

Furthermore, if the plate is square (a=b), the maximum deflection, which occurs at the center, is obtained from equation (13), as follows:

$$d_{max} = \frac{4Pa^2}{\pi^4 D} \sum_{m=1,3,\dots}^{\infty} \sum_{n=1,3,\dots}^{\infty} \frac{1}{(m^2 + n^2)^2} \tag{14}$$

By retaining the first nine terms of this series (m=1, n=1,3,5; m=3, n=1,3,5; m=5, n=1,3,5) the following is obtained:

$$d_{max} = \frac{4Pa^2}{\pi^4 D}\left[\frac{1}{4} + \frac{2}{100} + \frac{1}{324} + \frac{2}{625} + \frac{2}{1156} + \frac{1}{2500}\right] = 0.01159\frac{Pa^2}{D} \tag{15}$$

Using the approach described above, the following table can be deduced:

TABLE 1

Maximum displacement values for particular plates conditions.

| | Distributed load p | Concentrated load P at the center |
|---|---|---|
| Simply supported square plate | $d_{max} = 0.00406\frac{pa^4}{D}$ | $d_{max} = 0.01159\frac{Pa^2}{D}$ |
| Clamped or fixed edges square plate | $d_{max} = 0.00126\frac{pa^4}{D}$ | $d_{max} = 0.00560\frac{Pa^2}{D}$ |

For a glass sheet as described above, a rectangular plate simply supported or clamped on all edges is considered. For dimensions, sides a=235 mm and b=185 mm (a≥b) and thickness t=0.55 mm are considered. Further, the glass sheet is subjected to a uniformly distributed force $p_0$ over a contact area of sides u=20 mm and v=10 mm (magnet size) which center is located at the plate center, with Young's modulus E=70,000 MPa and Poisson's ratio v=0.25.

For a bending radius R of 150 mm in the plate x direction (i.e. in the 235 mm direction), the maximum deflection $d_{max}$ is equal to 43.72 mm, deduced from the below equation, $$R = \frac{\left(2R\ \sin\left(\frac{a}{2R}\right)\right)^2}{8d_{max}} + \frac{d_{max}}{2} \tag{16}$$

The relation between the applied force and the maximum deflection can be derived from equation (13) for simply supported condition as following:

$$d_{max} = \frac{\left(-0.00754\left(\frac{uv}{ab}\right)^{\frac{1}{4}} + 0.0116\right)Pa^3}{Db}, \text{ with } a \geq b \quad (17)$$

$$P = \frac{Db.d_{max}}{\left(-0.00754\left(\frac{uv}{ab}\right)^{\frac{1}{4}} + 0.0116\right)a^3}, \text{ with } a \geq b \quad (18)$$

$$P = 66.95 \ N \quad (19)$$

An equivalent expression can derived also for the clamped condition:

$$d_{max} = \frac{\left(-0.00434\left(\frac{uv}{ab}\right)^{\frac{1}{4}} + 0.0056\right)Pa^3}{Db}, \text{ with with } a \geq b \quad (20)$$

$$P = \frac{Db.d_{max}}{\left(-0.00434\left(\frac{uv}{ab}\right)^{\frac{1}{4}} + 0.0056\right)a^3}, \text{ with with } a \geq b \quad (21)$$

$$P = 144.35 \ N \quad (22)$$

Figure 17:
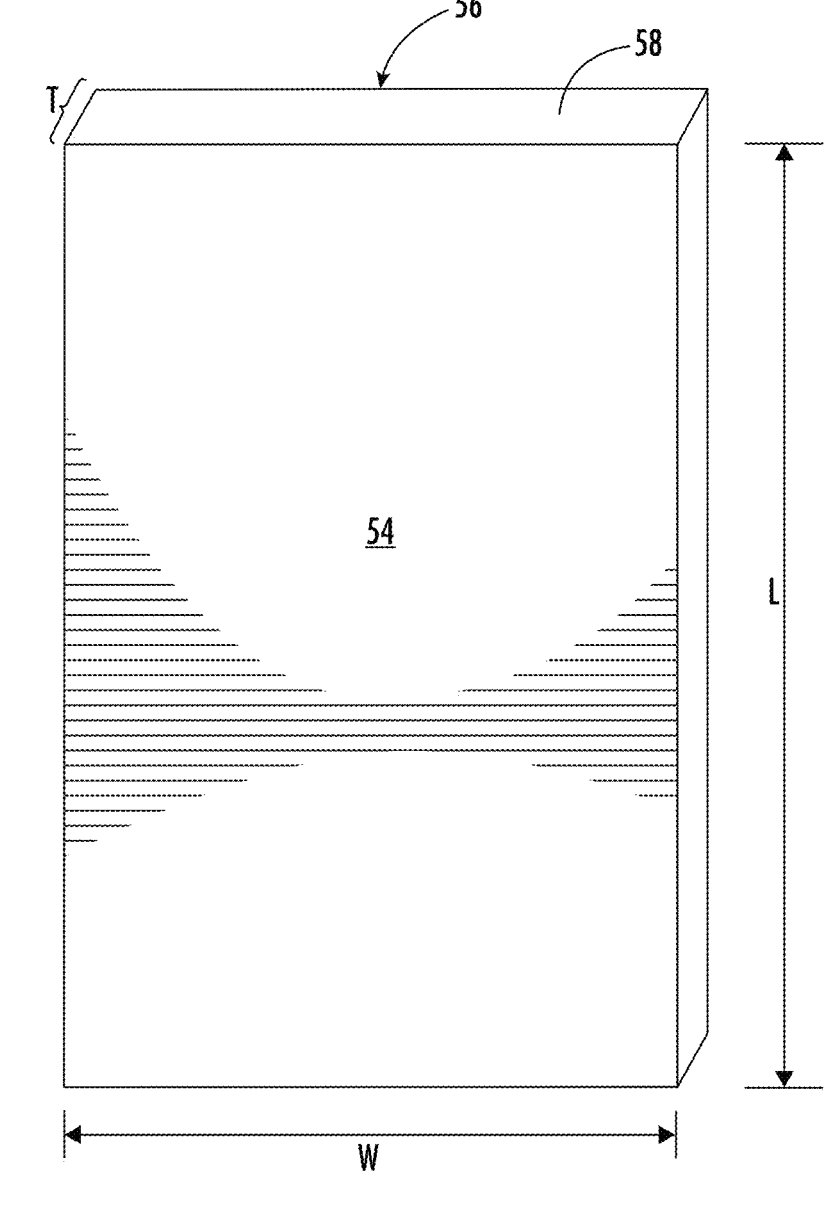
FIG. 17 depicts a glass sheet usable for forming the curved magnetic glass article, according to an exemplary embodiment.

In the following paragraphs, various geometrical, mechanical, and strengthening properties of the glass sheet 52 as well as compositions of the glass sheet are provided. Referring to FIG. 17, additional structural details of glass sheet 52 are shown and described. As noted above, glass sheet 52 has a thickness T that is substantially constant and is defined as a distance between the first major surface 54 and the second major surface 56. In various embodiments, T may refer to an average thickness or a maximum thickness of the glass sheet. In addition, glass sheet 52 includes a width W defined as a first maximum dimension of one of the first or second major surfaces 54, 56 orthogonal to the thickness T, and a length L defined as a second maximum dimension of one of the first or second major surfaces 54, 56 orthogonal to both the thickness and the width. In other embodiments, W and L may be the average width and the average length of glass sheet 52, respectively.

In various embodiments, average or maximum thickness T is in the range of 0.3 mm to 2 mm. In various embodiments, width W is in a range from 5 cm to 250 cm, and length L is in a range from about 5 cm to about 1500 cm. As mentioned above, the radius of curvature of glass sheet 52 is about 30 mm to about 1000 mm.

In embodiments, the glass sheet 52 may be strengthened. In one or more embodiments, glass sheet 52 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 52 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 52 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheet 52 may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T of the glass sheet (as described herein). For example, in one or more embodiments, the DOC may be in the range of about 0.05 T to about 0.25 T. In some instances, the DOC may be in the range of about 20 μm to about 300 μm. In one or more embodiments, the strengthened glass sheet 52 may have a CS (which may be found at the surface or a depth within the glass sheet) of about 200 MPa or greater, about 500 MPa or greater, or about 1050 MPa or greater. In one or more embodiments, the strengthened glass sheet may have a maximum tensile stress or central tension (CT) in the range of about 20 MPa to about 100 MPa.

Suitable glass compositions for use as glass sheet 52 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %. In one or more embodiments, the glass composition includes $Al_2O_3$ in an amount of about 3 mol % to about 15 mol %. In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass.

In one or more embodiments, the glass composition comprises $B_2O_3$ in an amount in the range of about 0.01 mol % to about 5 mol %. However, in one or more embodiments, the glass composition is substantially free of $B_2O_3$. As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ in an amount of about 0.01 mol % to 2 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is in a range from about 8 mol % to about 20 mol %. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount in a range from about from about 8 mol % to about 20 mol %. In one or more embodiments, the glass composition includes $K_2O$ in an amount in a range from about 0 mol % to about 4 mol %. In one or more embodiments, the glass composition may be substantially free of $K_2O$. In one or more embodiments, the glass composition is substantially free of $Li_2O$. In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In one or more embodiments, the glass composition includes CaO in an amount less than about 1 mol %. In one or more embodiments, the glass composition is substantially free of CaO. In some embodiments, the glass composition comprises MgO in an amount from about 0 mol % to about 7 mol %.

In one or more embodiments, the glass composition comprises $ZrO_2$ in an amount equal to or less than about 0.2 mol %. In one or more embodiments, the glass composition comprises $SnO_2$ in an amount equal to or less than about 0.2 mol %.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to 1 mol %. Where the glass composition includes $TiO_2$, $TiO_2$ may be present in an amount of about 5 mol % or less.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass sheet 52 may be made from any glass composition falling with any one of the exact numerical ranges discussed above.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A glass article of a vehicle interior system, comprising:
at least one magnet;
a frame comprising a curved support surface having a fixed curvature, the frame configured to hold the at least one magnet;
a glass sheet comprising a first major surface and a second major surface opposite to the first major surface, the glass sheet arranged with the second major surface facing toward the curved support surface; and
at least one metal strip disposed on the glass sheet;
wherein the at least one metal strip and the at least one magnet create a magnetic connection that holds the glass sheet in conformity with the curved support surface when the glass sheet is elastically deformed, wherein the magnetic connection prevents the glass sheet from springing back to a flat configuration, and
wherein the frame comprises a first sidewall and a second sidewall disposed at opposite edges of the glass sheet, wherein the first sidewall comprises at least one first pillar and the second sidewall comprises at least one second pillar and wherein the at least one magnet comprises at least one first magnet and at least one second magnet, the at least one first magnet disposed in the at least one first pillar and the at least one second magnet disposed in the at least one second pillar.

2. The glass article of claim 1, wherein the at least one metal strip is a continuous metal strip and wherein the at least one metal strip is disposed on first major surface of the glass sheet.

3. The glass article of claim 2, comprising no adhesive joining the glass sheet to the frame and no adhesive joining the glass sheet to the at least one metal strip.

4. The glass article of claim 1, wherein the at least one metal strip is adhered to the second major surface of the glass sheet.

5. The glass article of claim 4, wherein the at least one metal strip is discontinuous.

6. The glass article of claim 1, wherein a first magnetic force created by the at least one first magnet is spread substantially evenly across each of the at least one first pillar and wherein a second magnetic force created by the at least one second magnet is spread substantially evenly across each of the at least one second pillar.

7. The glass article of claim 1, wherein each of the at least one first magnet is located at a position on the first sidewall corresponding to a maximum deflection of the glass sheet and wherein each of the at least one second magnet is located at a position on the second sidewall corresponding to the maximum deflection of the glass sheet.

8. The glass article of claim 1, wherein each of the at least one first pillar comprises a first stopper to hold the at least one first magnet at the curved support surface and wherein each of the at least one second pillar comprises a second stopper to hold the at least one second magnet at the curved support surface.

9. The glass article of claim 1, wherein the at least one metal strip comprises a thickness of 1 mm or less.

10. The glass article of claim 1, wherein the curved support surface defines a radius of curvature of 50 mm to 5 m.

11. The glass article of claim 1, wherein the magnetic connection exerts a force of at least 140 N on the glass sheet.

12. The glass article of claim 1, wherein the at least one metal strip is arranged perpendicular to a curvature defined by the curved support surface.

13. D) A method of forming a curved glass article for a vehicle interior system, the method comprising:
positioning a first major surface of a glass sheet over a curved support surface of a frame, the frame comprising at least one magnet and the curved support surface having a fixed curvature; and
forming a magnetic connection between at least one metal strip disposed on the glass sheet and the at least one magnet to elastically deform the glass sheet and bend the glass sheet into conformity with the curved support surface at a temperature of 200° C. or less,
wherein the magnetic connection prevents the glass sheet from springing back to a flat configuration, and
wherein the frame comprises a first sidewall and a second sidewall disposed at opposite edges of the glass sheet, wherein the first sidewall comprises at least one first pillar and the second sidewall comprises at least one second pillar and wherein the at least one magnet comprises at least one first magnet and at least one second magnet, the at least one first magnet disposed in the at least one first pillar and the at least one second magnet disposed in the at least one second pillar.

14. The method of claim 13, wherein the at least one metal strip is a continuous metal strip disposed on a second major surface of the glass sheet, wherein the second major surface is opposite to the first major surface, wherein the method does not comprise a step of applying an adhesive between the at least one metal strip and the glass sheet.

15. The method of claim 13, wherein the at least one metal strip is adhered to the first major surface of the glass sheet and wherein the at least one metal strip comprises a plurality of metal foils spaced apart from each other.

16. The method of claim 13, wherein the magnetic connection exerts a force of at least 140 N on the glass sheet.

* * * * *